United States Patent [19]
Kinsella

[11] Patent Number: 5,557,955
[45] Date of Patent: Sep. 24, 1996

[54] HOT WATER FAUCET LOCKING DEVICE

[76] Inventor: Daniel E. Kinsella, P.O. Box 2035, Nantucket, Mass. 02584

[21] Appl. No.: 360,162

[22] Filed: Dec. 20, 1994

[51] Int. Cl.⁶ .................................................. F16K 35/00
[52] U.S. Cl. ............................................. 70/177; 70/211
[58] Field of Search ............................ 70/207, 209–212, 70/175–178, 455, 416, DIG. 58; 137/385; 251/90

[56] References Cited

U.S. PATENT DOCUMENTS

| | | | |
|---|---|---|---|
| 2,838,064 | 6/1958 | Schieberl | 70/175 |
| 4,620,428 | 11/1986 | Kopesky | 70/175 |
| 4,715,200 | 12/1987 | Katsaros | 70/416 |
| 5,052,202 | 10/1991 | Murphy | 70/416 |
| 5,058,622 | 10/1991 | Chitty | 137/385 |
| 5,165,263 | 11/1992 | Perron | 70/212 |
| 5,213,308 | 5/1993 | Jeromson | 70/180 |
| 5,236,172 | 8/1993 | Friemoth | 251/90 |

Primary Examiner—Steven N. Meyers
Assistant Examiner—Gary Estremsky

[57] ABSTRACT

A hot water faucet locking device comprising: an outer shell having an inboard region and an outboard region, the inboard region formed in a planar configuration with an inner surface and an outer surface, the inner surface including a cylindrical shaped bore, the outboard region being formed in a generally rectangular configuration with an inner surface and an outer surface, the inner surface including a generally rectangular shaped bore; and an insert including an inboard region and an outboard region, the insert having an upper surface and a lower surface, the upper surface following the contour of the bore in the shell and adapted to be affixed therein, the lower surface including a cylindrical shaped hollow projection extending therefrom, the projection having a cylindrical central portion adapted to fit snugly upon a water faucet in the operative orientation.

1 Claim, 4 Drawing Sheets

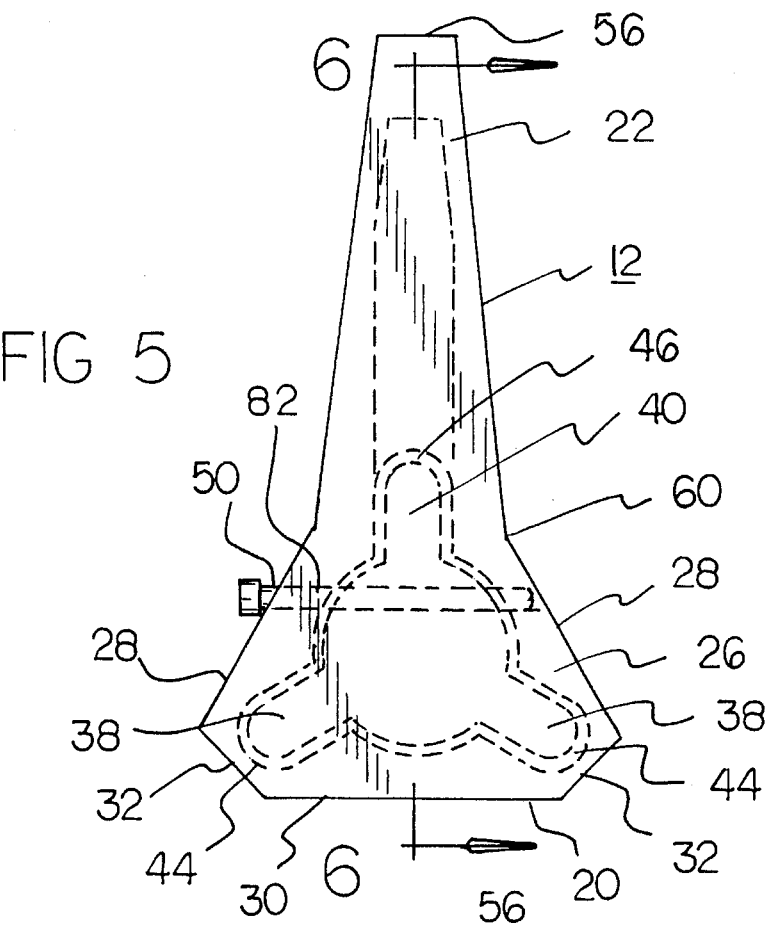
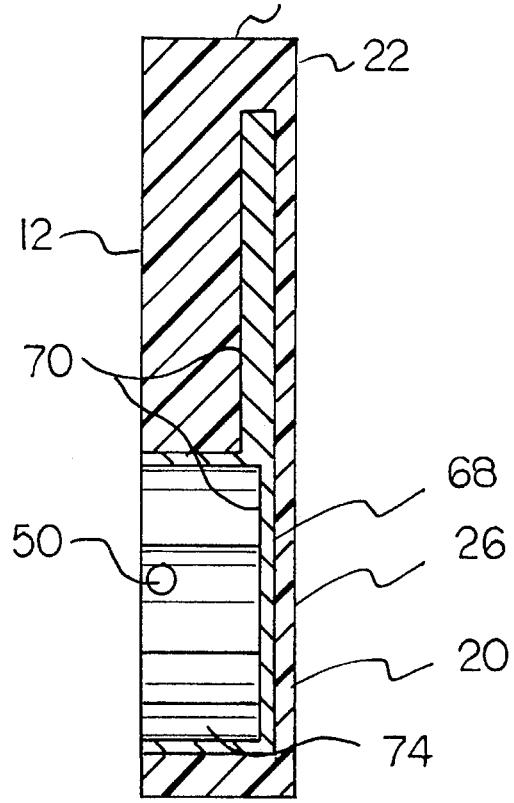

HOT WATER FAUCET LOCKING DEVICE

BACKGROUND OF THE INVENTION

1. Field of the Invention

The present invention relates to a hot water faucet locking device and more particularly pertains to positioning the apparatus over a hot water faucet control knob with the extension arm wedged between the shower control handle and the faucet to prevent unauthorized access.

2. Description of the Prior Art

The use of faucet security devices is known in the prior art. More specifically, faucet security devices heretofore devised and utilized for the purpose of preventing unauthorized access to faucets and their associated contents are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,176,014 to Erickson a faucet locking apparatus.

U.S. Pat. No. 4,516,414 to Woolvin discloses a security locking device for outdoor water faucets.

U.S. Pat. No. 5,247,816 to Munsterer discloses a locking means, for a faucet.

U.S. Pat. No. 5,217,201 to Self discloses a hot water faucet safety apparatus.

Lastly, U.S. Pat. No. 5,115,834 to Champagne discloses a valve-locking device.

In this respect, the hot water faucet locking device according to the present invention substantially departs from the conventional concepts and designs of the prior art, and in doing so provides an apparatus primarily developed for the purpose of positioning the apparatus over a hot water faucet control knob with the extension arm wedged between the shower control handle and the faucet to prevent unauthorized access.

Therefore, it can be appreciated that there exists a continuing need for a new and improved hot water faucet locking device which can be used for positioning the apparatus over a hot water faucet control knob with the extension arm wedged between the shower control handle and the faucet to prevent unauthorized access. In this regard, the present invention substantially fulfills this need.

SUMMARY OF THE INVENTION

In view of the foregoing disadvantages inherent in the known types of faucet security devices now present in the prior art, the present invention provides an improved hot water faucet locking device. As such, the general purpose of the present invention, which will be described subsequently in greater detail, is to provide a new and improved hot water faucet locking device and method which has all the advantages of the prior art and none of the disadvantages.

To attain this, the present invention essentially comprises a new and improved hot water faucet locking device comprising, in combination: an outer shell being fabricated of plastic and including an inboard region and an outboard region, the inboard region formed in a planar configuration with an inner surface and an outer surface, the inboard region having two side edges formed contiguously with the outboard region and angled outwardly therefrom, the inboard region having a linear side edge positioned between the angled side edges and inboardly with respect thereto, a short side edge being positioned between each end of the linear side edge and the outboard end of each angled side edge, the inner surface of the shell including a generally cylindrical shaped bore with a central portion and three generally semi cylindrical shaped outer portions, a first and second outer portion having its rounded end positioned adjacent to each short side edge of the inboard region, a third outer portion having its rounded end positioned adjacent to the outboard region of the shell, an angled side edge of the inboard region including a cylindrical bore extending therein to a point adjacent to the opposite angled side edge; an outboard region of the outer shell being formed contiguously with the inboard region and having an inner surface and an outer surface, the outboard region being formed in a generally V-shaped orientation with a linear edge at its apex, the apex defining the outboard extent of the outboard region and having a smaller width than the remainder thereof, the inboard extent of the outboard region having a large width and formed contiguously with the inboard region, the outboard region having a gradually decreasing width between its inboard and outboard extents, the inner surface including a generally rectangular shaped bore extending through the majority of its length; and an insert fabricated of metal and including an inboard region and an outboard region, the insert having an upper surface and a lower surface, the upper surface following the contour of the bore in the shell and adapted to be affixed therein, the lower surface of the insert also following the contour of the bore in the shell, the outboard region of the insert being :formed as a generally planar handle, the inboard region of the insert including a generally cylindrical shaped hollow projection extending downwardly therefrom, the projection having a central portion and three generally semi cylindrical shaped outer portions, the insert including generally axially positioned apertures adjacent to its outboard outer portion, the insert adapted to be positioned over a hot water faucet handle in the operative orientation, a lock pin being formed in a cylindrical configuration with a planar circular head at one extent, the pin adapted to be positioned through the bore in the angled side edge of the shell.

There has thus been outlined, rather broadly, the more important features of the invention in order that the detailed description thereof that follows may be better understood and in order that the present contribution to the art may be better appreciated. There are, of course, additional features of the invention that will be ,described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hot water faucet locking device which has all of the advantages of the prior art faucet security devices and none of the disadvantages.

It is another object of the present invention to provide a new and improved hot water faucet locking device which may be easily and efficiently manufactured and marketed.

It is further object of the present invention to provide a new and improved hot water faucet locking device which is of durable and reliable constructions.

An even further object of the present invention is to provide a new and improved hot water faucet locking device which is susceptible of a low cost of manufacture with regard to both materials and labor, and which accordingly is then susceptible of low prices of sale to the consuming public, thereby making such hot water faucet locking device economically available to the buying public.

Still yet another object of the present invention is to provide a new and improved hot water faucet locking device which provides in the apparatuses and methods of the prior art some of the advantages thereof, while simultaneously overcoming some of the disadvantages normally associated therewith.

Still another object of the present invention is to position the apparatus over a hot water faucet control knob with the extension arm wedge a between the shower control handle and the faucet to prevent unauthorized access.

Lastly, it is an object of the present invention to provide a new and improved hot water faucet locking device comprising: an outer shell having an inboard region and an outboard region, the inboard region formed in a planar configuration with an inner surface and an outer surface, the inner surface including a cylindrical shaped bore, the outboard region being formed in a generally rectangular configuration with an inner surface and an outer surface, the inner surface including a generally rectangular shaped bore; and an insert including an inboard region and an outboard region, the insert having an upper surface and a lower surface, the upper surface following the contour of the bore in the shell and adapted to be affixed therein, the lower surface including a cylindrical shaped hollow projection extending therefrom, the projection having a cylindrical central portion adapted to fit snugly upon a water faucet in the operative orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein:

FIG. 5 is a top plan view of the outer surface of the apparatus illustrating the positioning of the insert and lock pin components therein.

FIG. 6 is a cross sectional view of the apparatus taken along line 6—6 of FIG. 5.

The same reference numerals refer to the same parts through the various Figures.

DESCRIPTION OF THE PREFERRED EMBODIMENT

Figure 1:
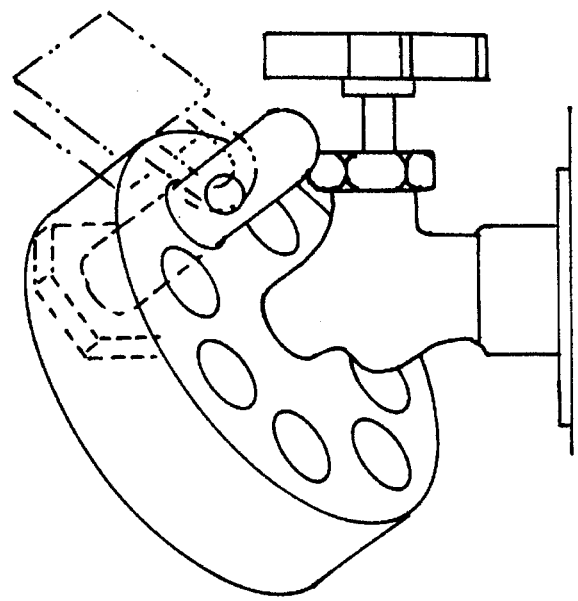
FIGS. 1 and 2 are illustrations of prior art faucet security devices.
Figure 2:
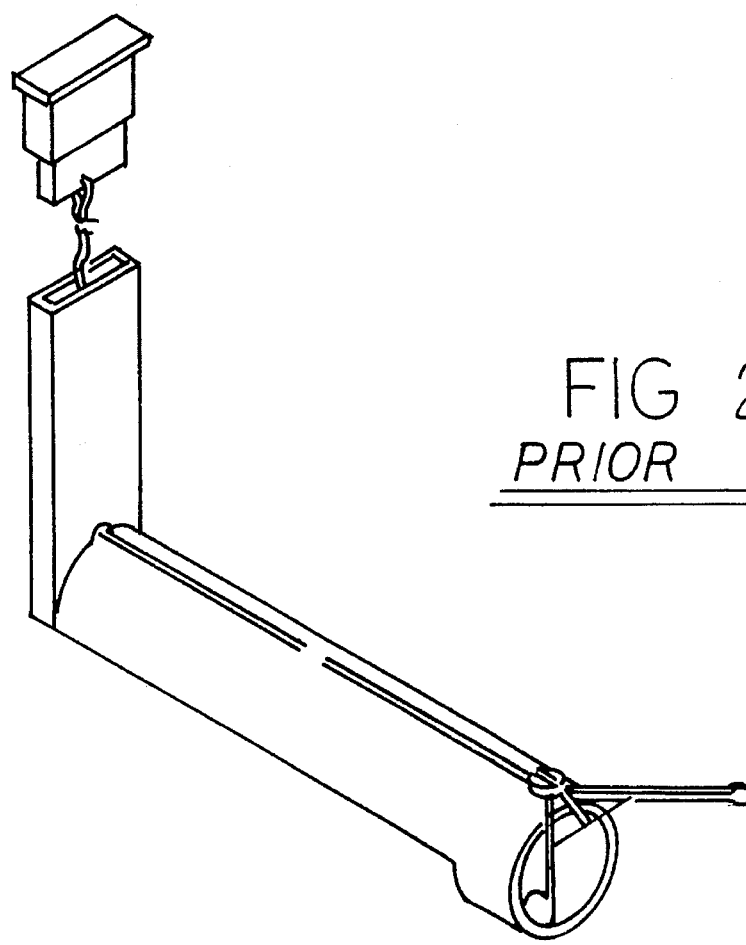

With reference now to the drawings, and in particular to FIG. 1 thereof, the preferred embodiment of the new and improved hot water faucet locking device embodying the principles and concepts of the present invention and generally designated by the reference numeral 10 will be described.

The present invention, the hot water faucet locking device 10 is comprised of a plurality of components. Such components in their broadest context include an outer shell 12, an insert 14 and a lock pin 16. Such components are individually configured and correlated with respect to each other so as to attain the desired objective.

Figure 3:
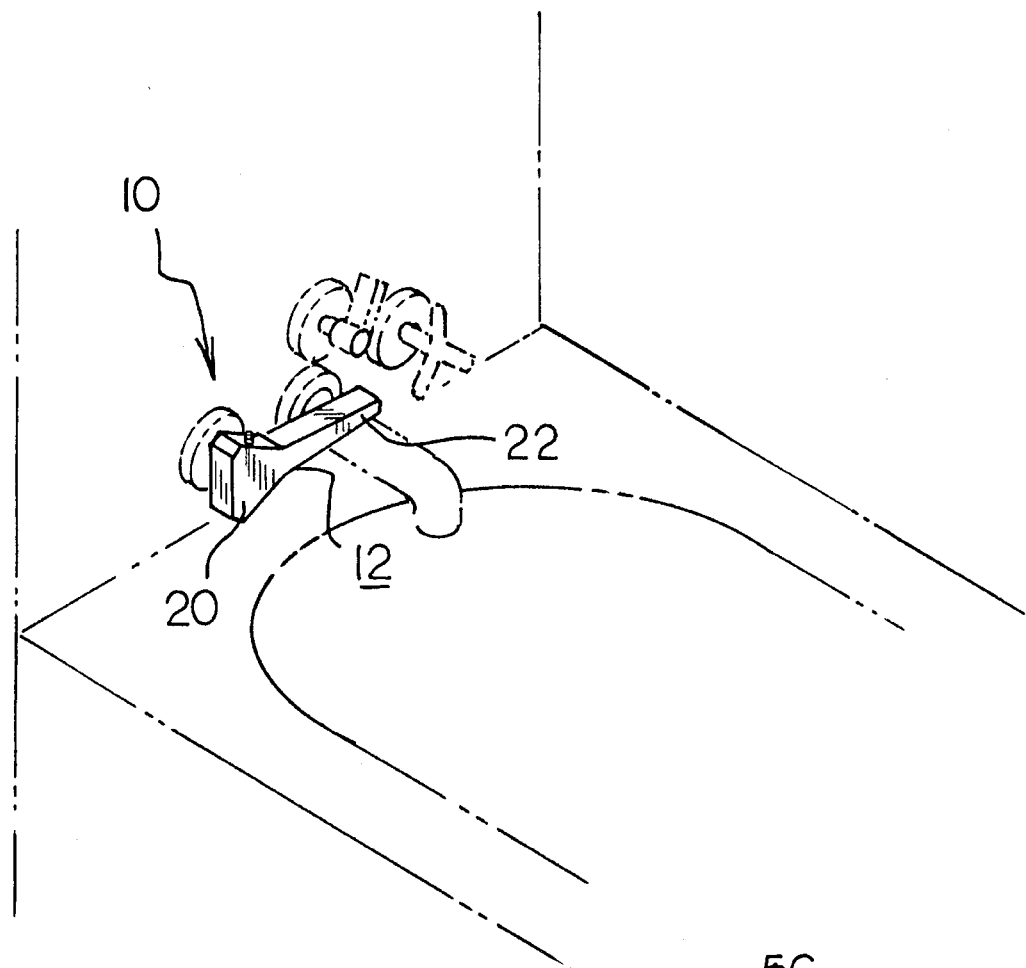
FIG. 3 is a perspective view of the preferred embodiment of the hot water faucet locking device constructed in accordance with the principles of the present invention.
Figure 7:
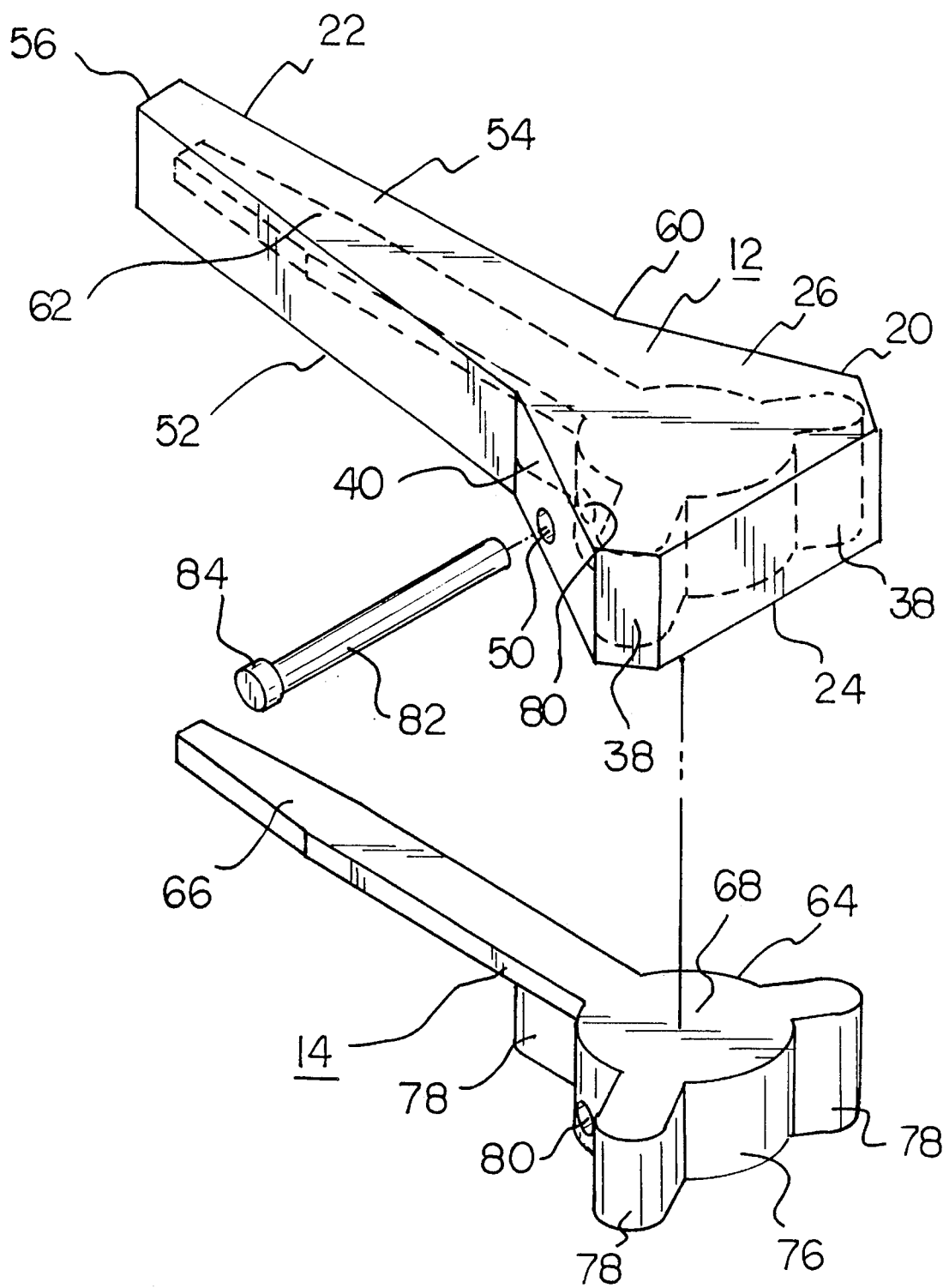
FIG. 7 is a separated perspective view of the apparatus illustrating the various components thereof.

More specifically, the outer shell 12 is fabricated of plastic and includes an inboard region 20 and an outboard region 22. The shell may be manufactured of recycled plastic. The sturdy construction of the shell prevents cracking and breakage. The inboard region 20 is formed in a planar configuration with an inner surface 24 and an outer surface 26. The inboard region has two side edges 28 which are formed contiguously with the outboard region and are angled outwardly therefrom. The inboard region has a linear side edge 30 which is positioned between the angled side edges. The linear side edge is also positioned inboardly with respect to the angled side edges. A short side edge 32 is positioned between each end of the linear side edge and the outboard end of each angled side edge. The inboard region of the apparatus is large enough to contain a water faucet handle therein. Note FIGS. 3, 6 and 7.

The inner surface of the shell includes a generally cylindrical shaped bore with a central portion 36 and three generally semi cylindrical shaped outer portions 38, 40. A first and second outer portion 38 have their rounded end 44 positioned adjacent to each short side edge 32 of the inboard region. A third outer portion 46 has its rounded end positioned adjacent to the outboard region of the shell. The central and outer portions of the bore are adapted to be positioned over a hot water faucet handle in the operative orientation. In alternative embodiments of the apparatus the central bore 36 is shaped in a wide variety of configurations to accommodate many different types of water faucets. An angled side edge of the inboard region includes a cylindrical hole 50 which extends to a point adjacent to the opposite angled side edge. Note FIGS. 6 and 7.

Figure 4:
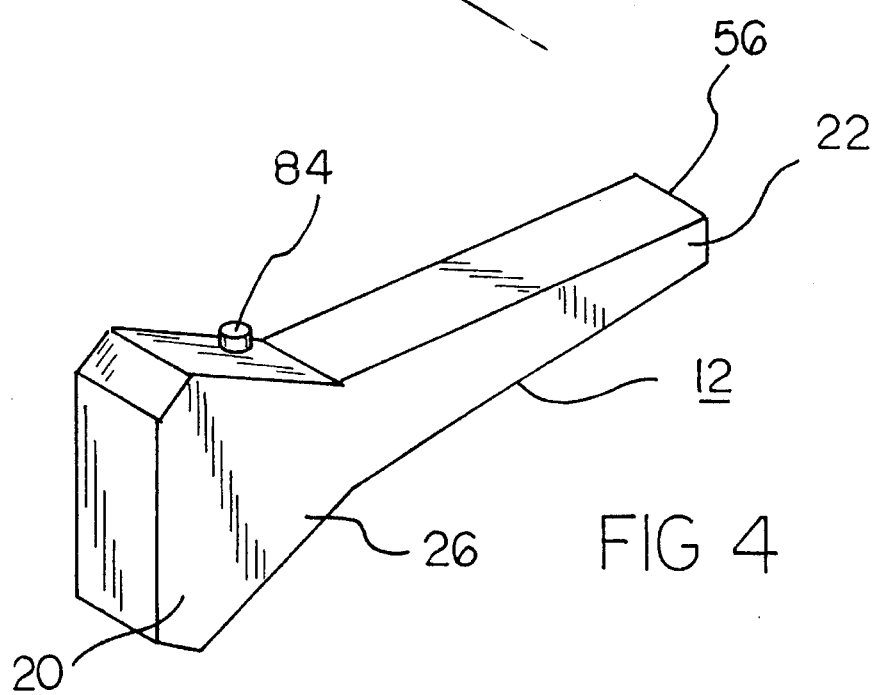
FIG. 4 is side perspective view of the apparatus illustrating its outer surface.

The outboard region 22 of the outer shell is formed contiguously with the inboard region and has an inner surface 52 and an outer surface 54. The outboard region is formed in a generally V-shaped orientation with a linear edge 56 at its apex. The apex defines the outboard extent of the outboard region and has a smaller width than the remainder thereof. The outboard region provides the user with a firm gripping surface. The inboard extent 60 of the outboard region has a large width and is formed contiguously with the inboard region. The outboard region has a gradually decreasing width between its inboard and outboard extents. The inner surface includes a generally rectangular shaped bore 62 which extends through the majority of its length. In the operative orientation the outboard region is positioned between the shower control and faucet. Note FIGS. 3, 4 and 7.

An insert 14 is fabricated of metal and includes an inboard region 64 and an outboard region 66. The sturdy metal construction provides strength and stability to the apparatus. The insert has an upper surface 68 and a lower surface 70. The upper surface follows the contour of the bore in the shell and is adapted to be affixed therein. The lower surface of the insert also follows the contour of the bore in the shell. The outboard region of the insert is formed as a generally planar handle. The insert is welded into the plastic shell to prevent slippage when utilizing the apparatus. Note FIGS. 6 and 7.

The inboard region of the insert includes a generally cylindrical shaped hollow projection which extends downwardly from its lower surface. The projection has a central portion 76 and three generally semi cylindrical shaped outer portions 78. In alternative embodiments of the apparatus the central portion 76 of the projection is shaped in a wide variety of configurations to accommodate many different types of water faucets. Note FIGS. 5 and 6.

The insert includes generally axially positioned apertures 80 adjacent to its outboard outer portion. The insert is adapted to be positioned over a hot water faucet handle in the operative orientation. A lock pin 82 is formed in a cylindrical configuration with a planar circular head 84 at one extent. The pin is adapted to be positioned through the bore in the angled side edge of the shell. The lock pin prevents removal of the apparatus from the faucet. In the operative orientation the outboard region of the apparatus is positioned in a locked orientation between the shower control and faucet. This configuration not only prevents unauthorized removal of the device, but also prevents turning of the hot water faucet knob. In summary, the apparatus prevents children from initiating potentially harmful hot water flow. Note FIGS. 3, 4 and 5.

The hot water faucet locking device is an attachment designed for use on many different types of faucets. The apparatus can easily be slipped over a hot water control knob to prevent unauthorized access. The outer shell is made of plastic. A metallic insert is permanently embedded in the outer shell. The apparatus is sized and shaped to fit snugly over a faucet control knob. An outboardly positioned extension arm projects from the inboard region of the apparatus. A lock pin serves to maintain the entire assembly in place as it is installed.

When utilizing the apparatus the metallic insert is first slipped over the faucet control knob. The lock pin is then slipped into place. As this is being done, the aforementioned extension arm is placed between the shower control valve extension and the spigot of the faucet itself. With the apparatus positioned in this orientation the faucet control knob cannot be rotated in either direction until the hot water faucet locking device is removed from the faucet. When hot water is required, it is a simple matter to quickly pull the locking pin out and remove the attachment.

This safety enhancing attachment is ideal for use in households with small children. An adult can easily pull the pin and remove the attachment when access to hot water is desired. However, it would be virtually impossible for a child to remove the apparatus and independently initiate water flow. In this fashion, parents and guardians will be assured that children will be prevented unauthorized access to potentially harmful hot water.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved hot water faucet locking device comprising, in combination:

an outer shell being fabricated of recycled plastic and including an inboard region and an outboard region, the inboard region formed in a planar configuration with an inner surface and an outer surface, the inboard region having two side edges formed contiguously with the outboard region and angled outwardly therefrom, the inboard region having a linear side edge positioned between the angled side edges and inboardly with respect thereto, a short side edge being positioned between each end of the linear side edge and the outboard end of each angled side edge, the inboard region adapted to be large enough to contain a water faucet handle therein, the inner surface of the shell including a generally cylindrical shaped bore with a central portion and three generally semi cylindrical shaped outer portions, a first and second outer portion having its rounded end positioned adjacent to each short side edge of the inboard region, a third outer portion having its rounded end positioned adjacent to the outboard region of the shell, the central and outer portions of the bore being adapted to be positioned over a hot water faucet handle in an operative orientation, an angled side edge of the inboard region including a cylindrical hole extending therein to a point adjacent to the opposite angled side edge;

an outboard region of the outer shell being formed contiguously with the inboard region and having an inner surface and an outer surface, the outboard region being formed in a generally V-shaped orientation with a linear edge at its apex, the apex defining the outboard extent of the outboard region and having a smaller width than the remainder thereof, the inboard extent of the outboard region having a large width and formed contiguously with the inboard region, the outboard region having a gradually decreasing width between its inboard and outboard extents, the inner surface including a generally rectangular shaped bore extending through the majority of its length, in an operative orientation the outboard region is adapted to be positioned between a shower control and faucet; and an insert fabricated of metal and including an inboard region and an outboard region, the insert being welded into the plastic shell to prevent slippage when utilizing the apparatus, the insert having an upper surface and a lower surface, the upper surface following the contour of the bore in the shell and adapted to be affixed therein, the lower surface of the insert also following the contour of the bore in the shell, the outboard region of the insert being formed as a generally planar handle, the inboard region of the insert including a generally cylindrical shaped hollow projection extending downwardly therefrom, the projection having a central portion and three generally semi cylindrical shaped outer portions, the insert including generally axially positioned apertures adjacent to its outboard outer portion, the insert adapted to be positioned over a hot water faucet handle in the operative orientation, a lock pin being formed in a cylindrical configuration with a planar circular head at one extent, the pin adapted to be positioned through the bore in the angled side edge of the shell.

* * * * *